April 27, 1926.
G. FRATZKE
POTATO BEETLE EXTERMINATOR
Filed April 24, 1923
1,582,744
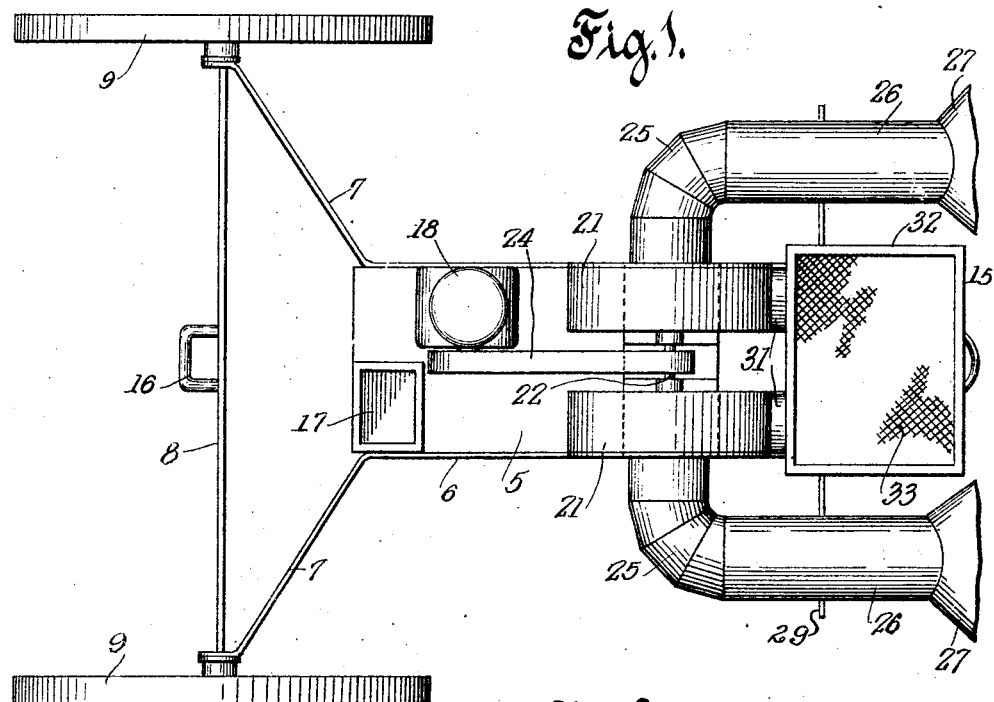
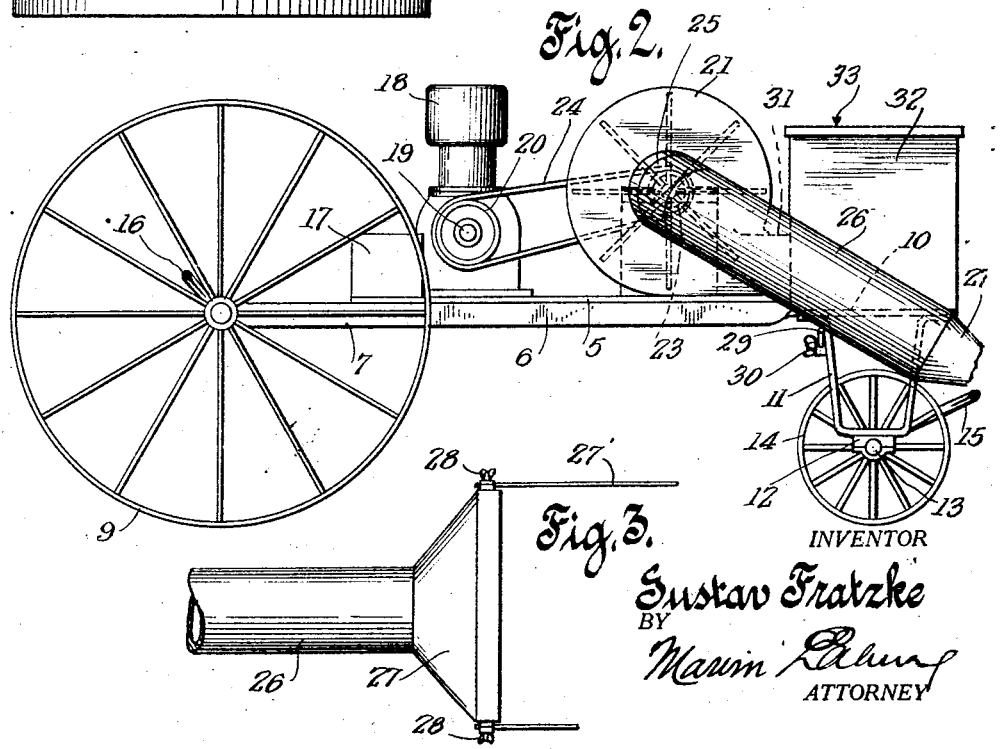
INVENTOR
Gustav Fratzke
BY
Marvin Lehring
ATTORNEY Patented Apr. 27, 1926.

1,582,744

UNITED STATES PATENT OFFICE.

GUSTAV FRATZKE, OF MERRILL, WISCONSIN.

POTATO-BEETLE EXTERMINATOR.

Application filed April 24, 1923. Serial No. 634,212.

*To all whom it may concern:*

Be it known that I, GUSTAV FRATZKE, a citizen of the United States, residing at Merrill, in the county of Lincoln and State of Wisconsin, have invented certain new and useful Improvements in Potato-Beetle Exterminators, of which the following is a specification.

This invention relates to improvements in devices for capturing insects which infest growing plants, such for instance as potato bugs and has for its object to provide a truck carried apparatus intended to be drawn or pushed over rows or hills of plants upon which the insects feed.

Another purpose is to provide means for capturing the insects alive from two rows of plants simultaneously, drawing them from the plants by suction and delivering them into a receptacle for the purpose of extermination.

These objects are attained by the novel construction and arrangement of parts hereafter described and shown in the accompanying drawing, in which:—

Figure 1 is a plan view of an embodiment of the invention.

Figure 2 is a side view of the same.

Figure 3 is a fragmentary plan view of one of the gathering heads.

A platform, designated by the numeral 5, is carried by a light but strong frame 6 having diverging members 7 at its rear end, these members being supported near the ends of an axle bar 8 mounted in a pair of widely spaced wheels 9 having wide rims.

The forward end of the frame 6 is engaged with a plate member 10 supported by a pair of brackets 11 having journals 12 for the shaft 13 mounted on a single small wheel 14 at the extreme front centrally of the apparatus.

Attached to the shaft 13 is a handle loop 15 for draft purposes, a similar attaching means 16 being fixed on the axle bar 8 extending to the rear.

A tool box 17 is carried on the platform affording a convenient receptacle for small articles used in connection with the apparatus and also fixed on the platform is a motor 18, its shaft 19 having fixed to it a driving pulley 20.

On the front end of the platform are secured a pair of enclosed suction fans 21 arranged in register and having a shaft 22 common to both. Fixed on this shaft is a pulley 23 to which motion from the pulley 20 is communicated by the belt 24.

These suction fans have inlets on their outer sides to which are secured tubes 25 bent at a right angle to extend forward in spaced parallel relation as at 26, the outer ends of these tubes terminating in flattened, fan-like suction heads 27 directed over the rows of plants and provided with extending rods 27', adjustably held by the clamp screws 28, the purpose of the rods being to gently move the foliage of the plants, shaking the bugs loose to be gathered by the heads 27.

The height of these heads relative to the surface is controlled by a transverse bar 29 held in adjustment by clamp screws 30 engaging in the brackets 11, and as the tubes rest upon the bar it is apparent the heads can readily be raised or lowered as desired.

The exhaust 31 of the fans is led into a container 32 resting on the plate 10 and provided with a ventilated cover 33, the openings of which are sufficiently small to prevent the escape of the insects.

Running, the motor being in operation and the heads 27 adjusted to proper height, the device is trundled over the field so that the heads are directly over contiguous rows of plants.

Suction from the blades of the fans act powerfully to draw the insects from the plants into the heads and tubes and through the fans to be discharged into the receptacle 32 from which they can be removed and destroyed as may be convenient.

From the foregoing it will be seen that an easily operated and effective apparatus has been disclosed, the use of which will prevent the loss of crops by reason of devastation by insects.

It is to be understood that changes in the form and construction can be made as experience approves without departing from the scope of the appended claim.

Having thus described my invention and set forth the manner of its construction, application and use, what I claim as new and desire to secure by Letters Patent, is:—

An insect catching apparatus comprising an axle having a pair of rear wheels spaced to straddle one or more rows of growing plants, a forward wheel intermediate said rear wheels, a handle on said axle for propelling the apparatus, a pair of fans on said truck, a motor to drive said fans, suction heads disposed to move over the rows of plants, tubular connections between said head and fans registering with the axis of the fans, a ventilated container for insects discharged therein from each of said fans, means for rigidly supporting said suction heads at an adjusted height, and pairs of whip like rods, vertically adjustable and connected to each of said suction heads on opposite sides thereof to make contact with both sides of the plants simultaneously.

In witness whereof I have affixed my signature.

GUSTAV FRATZKE.